United States Patent Office 2,893,435
Patented July 7, 1959

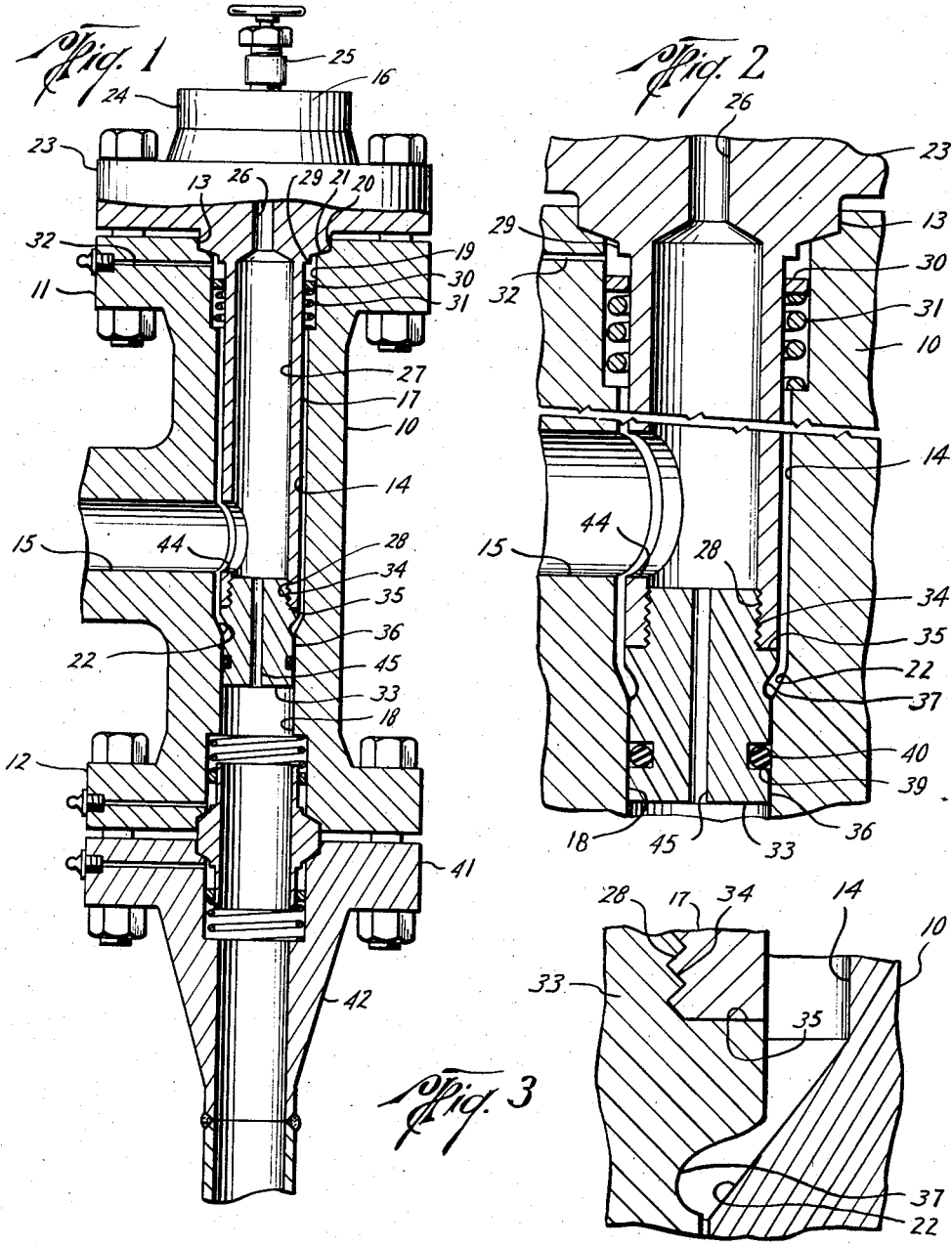

2,893,435
CHOKE

Robert Eichenberg, Houston, Tex., assignor, by mesne assignments, to McEvoy Company, Houston, Tex., a corporation of Texas Application February 3, 1956, Serial No. 563,238

6 Claims. (Cl. 138—44)

This invention pertains to high pressure chokes of the types used in well completion apparatus.

It is a principal object of the invention to provide a choke device wherein the flow throttling means is dependably secured in operating position in the device.

Another object of the invention is to provide a choke device in which the flow throttling means is easily removable for servicing or replacement.

Another object of the invention is to provide such a device having the flow throttling means connected to and removable with a closure means of the device.

Another object of the invention is to provide a choke device suitable for high pressure operating conditions.

Another object of the invention is to provide a choke device which may be easily serviced in the field without special equipment.

Still another object of the invention is to provide a choke device wherein the flow throttling means is held in place by non-galling threads.

Chokes of the above type are usually subjected to corrosive operating conditions and as a result must be made of corrosion-resistant materials such as stainless steels and other corrosion-resistant alloys. When such materials are threaded to receive a flow throttling element, for example a perforated flow bean, the threads are apt to gall after repeated uses under high pressures conditions, in which case leaks develop around the edges of the bean and the edges then rapidly deteriorate because of the high velocity of liquids passing through the leaks which eats away the threads. Therefore, the flow beans must be frequently replaced in the field and the replacement becomes difficult because of the erosion of the threads in the body of the choke into which the bean is screwed, necessitating repairing the threads or replacing the choke body. According to the present invention the bean is not screwed into threads in the choke body, but instead is screwed into a tubular extension of a bonnet closure and, when repairs or replacement of the bean are required all that is necessary is to remove the bonnet and the bean together and repair or replace them, which is far simpler and less costly than repairing the threads in the choke body or replacing the choke body. The bonnet and its tubular extension which holds the flow bean and the flow bean itself may be made of ordinary steel so as to be replaceable at low cost, and in that case no pronounced galling of the threads holding the flow bean will occur since threads cut in ordinary steel are not as susceptible to galling as are threads cut in stainless steel and other corrosion-resistant alloys. The choke according to the present invention includes a very efficient seal for preventing leaks around the bonnet and is therefore very reliable in high pressure uses.

Additional objects, uses, advantages and improvements of the invention will appear from the following description of a preferred embodiment thereof, reference being made to the accompanying drawings, of which:

Figure 1 is a vertical section of a preferred embodiment of the invention;

Figure 2 is an enlarged partial view similar to Figure 1, showing the bonnet seal means and the flow bean portions of the choke; and, Figure 3 is a further enlarged partial view similar to Figure 1 showing the means for guiding the flow bean into the apparatus.

Referring now in detail to the drawings, in Figure 1 there is shown the choke body 10 which has a shape similar to a flanged pipe T, the side flange thereof not being shown in the drawing. Body 10 has a longitudinal bore 14 of generally cylindrical shape having a lower bore portion 18 of reduced diameter and an upper recess portion 19 of increased diameter, the recess portion 19 having a deeper recessed portion 20 of greater diameter around its upper end. The lower end of recess 20 is in the form of a conical seat 21. The lower end of recess 19 is adapted to serve as a spring seat, as will be explained later. Above the upper end of lower bore portion 18 a second conical seat 22 is formed around the bore. A lateral inlet bore 15 intersects bore 14 at about the center thereof, and bore 15 is usually cylindrical and of a slightly smaller diameter than bore 14. The body 10 is provided with flanges 11 and 12, as shown, and a similar flange (not shown) is provided at the outer end of bore 15, these flanges serving as means for connecting body 10 to other well completion equipment.

The choke bonnet 16 has a flange portion 23 for bolting onto body flange 11, and has a lower tubular portion 17 which extends below flange 23 and is adapted to be received within bore 14, extending downwardly to a point above conical seat 22 of bore 14. Above flange 23 bonnet 16 has an upwardly formed substantially cylindrical block portion 24 which serves to add strength to the bonnet. A bull plug and bleeder port valve element 25 is screwed into the top of block portion 24 and axially thereof and a bore 26 extends from element 25 through bonnet 16 to just below the lower edge of flange 23. A larger bore 27 extends downwardly from bore 26 within tubular bonnet portion 17 and is provided with an internal thread formation 28 at its lower end.

Flange 23 of bonnet 16 is bolted to flange 11 of body 10. A shoulder 13 is formed around the upper end of tubular bonnet portion 17 below flange 23 and the lower surface of shoulder 13 is conical and of the same taper as the conical seat 21 of recess 20 upon which it seats. A smaller shoulder 29 is provided below shoulder 13 as shown. A slidable barrier 30 is disposed around tubular portion 17 within recess 19 and a helical spring 31 is received in recess 19 below barrier 30, the lower end of spring 31 being seated against the lower end of recess 19 and the upper end of spring 31 being seated against the lower surface of barrier 30, forcing barrier 30 upwardly in recess 19. A sealant injection port 32 is provided through flange 11 for introducing a sealant material into recess 19 above barrier 30, the small shoulder 29 preventing the barrier 30 from moving upwardly to entirely close port 32 and prevent the injection of sealant. Shoulder 13 is axially longer than recess 20 into which it snugly fits so that flanges 11 and 23 are held apart, and the bolts connecting flanges 11 and 23 are under sufficient tension to hold the conical seat surfaces together even under full choke pressure, yet the bolt tension is not sufficient to stress the conical surfaces to the yield point, so that there is no galling of the conical surfaces. Any pressure against the lower surface of barrier 30 will put pressure on the plastic sealing material in recess 19 and will force it into the minute openings between the seated conical surfaces thereabove to form a tight seal. The above described flange seal is disclosed in U.S. patent application Serial Number 401,484, filed December 31, 1953, by Allen F. Rhodes and Robert Eichenberg, and entitled "Seal."

The bore 27 has a lateral opening 44 which is alignable with lateral bore 15 of body 10, the flow line through the choke comprising bore 15, the lower end of bore 27, the opening through the flow bean 33, to be described later, and the lower end of bore 18.

The bean 33 is screwed into the thread formation 28 at the lower end of bore 27. Bean 33 has an upper threaded formation 34, an outwardly formed shoulder 35 adapted to seat against the lower end of tubular bonnet portion 17, and a lower cylindrical portion 36 which fits snugly within bore 18. The conical shoulder 22 serves as means for guiding the lower end of the bean into the lower end of bore 18. The bean has a concave recess 37 between shoulder 35 and cyindrical portion 36 so that clearance is provided between the bean and shoulder 22 when the bean is in position in the apparatus. A circular groove 39 around bean portion 36 receives O-ring packing 40 which provides a second seal around the bean in the bore. The bean 33 has an axial opening 45 therethrough of a size suitable for obtaining the desired well flow throttling.

Flange 12 of body 10 is bolted onto a flange 41 of pipe adapter 42, to which a pipe is welded for conveying away the discharge from the choke. The flange seal shown is disclosed in U.S. patent application S.N. 401,484, mentioned above. The flange at the outer end of lateral bore 15 may be similarly connected to well completion or Christmas Tree equipment, and a valve is usually provided adjacent the choke for controlling the flow to the choke.

Production from the well passes through some type of well head and Christmas Tree equipment and enters the choke through lateral bore 15. The production flow is suitably restricted or choked as it flows through opening 45 in bean 33, from whence the production flows out through a pipe line connected to adapter 42. The choke of this invention may be adapted for use under very high pressure flow conditions of the order of 15,000 pounds p.s.i., in which case it will be heavily constructed. The full choke pressure is present in lateral bore 15, within bore 27 of tubular bonnet portion 17, in the annular space around tubular portion 17 within bore 14 which is in communication with recess 19, and in bore 26 above bore 27. The barrier 30 and sealant material thereabove prevent loss of production and escape of pressure at bonnet 16 and the O-ring 40 prevents flow around the bean 33 in bore 18, so that all production entering the choke through bore 15 passes out of the choke through the bean opening 45 and the lower end of bore 18, thereafter entering the pipe adapter 42 and the pipe line connected thereto, which may lead to any flow receiving means such as tanks, pipe lines, and the like. The sealing means at the flanged connections of passages 15 and 18 are similar to the bonnet seal and are likewise capable of service under high pressure conditions.

As already mentioned, the bonnet, tubular bonnet extension, and flow bean may be made of different materials than the body. It may be desirable to make the body of a highly corrosion-resistant material for long life, and to make the bean and bonnet of a cheaper, less resistant material for low-cost replacement in the field, and to prevent loosening of the bean caused by thread galling and distortion around the bean. Any combination of materials of construction may be selected depending on the objectives and service.

While a preferred embodiment of the invention has been shown and described, many modifications thereof may be made by a person skilled in the art without departing from the spirit of the invention, and it is intended to protect by Letters Patent all forms of the invention falling within the scope of the following claims:

I claim:

1. A well flow choke device comprising a flow path having an intermediate smooth-walled portion, an inlet to said flow path from the well, an outlet from said flow path, separate access means to said smooth-walled portion of said flow path between said inlet and said outlet, flange connected closure means for said access means having an extension loosely receivable in said access means, replaceable flow constricting means removably connected only to said extension and not to said smooth-walled flow path portion in which it is disposed, means for sealing between said flow constricting means and said smooth-walled flow path portion, said extension holding said flow constricting means in said smooth-walled flow path portion when said access means is closed by said closure means, whereby flow through said flow path between said inlet and said outlet is choked by said flow constricting means, and whereby there are no interior flow path threads susceptible of galling.

2. The combination of claim 1 wherein said inlet is at right angles to said outlet and said outlet is in line with said access means, said smooth-walled flow path portion being between said right angle and outlet, said extension of said closure means extending through said access means and holding said flow constricting means in said flow path adjacent said outlet.

3. The combination of claim 2 wherein said extension is tubular and forms a part of said flow path, and wherein said flow constricting means is threadingly connected only to said extension and not to the smooth walls of said flow path.

4. The combination of claim 3 wherein said flow path, inlet, outlet, and access means are disposed in a body, said body having connection flanges at said inlet, at said outlet, and at the outer end of said access means, said inlet flange being connected to said well, said outlet flange being connected to flow receiving means, and said access means flange being connected to said closure means, each of said flange connections including a sealing means comprising an inner tubular wall having an axial opening therethrough forming a passage past the flanged connection, an outer tubular wall coaxial with said inner wall and spaced radially outwardly therefrom to form an annular space between the outer surface of said inner wall and said outer wall, said outer wall being an integral part of said body adjacent the flange, there being at one axial end of said annular space conical annular surfaces formed integrally with each of said inner and outer walls and flushly seated one on the other yet leaving minute openings therepast, there being at the other axial end of said annular space an annular spring seat formed in said outer wall, a slidable ring-shaped barrier in said annular space in sealing relation with the outer surface of said inner wall and said outer wall, a helical compression spring in said annular space in biasing relation between said spring seat and said barrier, a sealant injection port means, including a check valve for preventing flow of sealant from said annular space, for the injection of sealant therethrough into the portion of said annular space between said barrier and said conical surfaces, a body of said sealant within the portion of said annular space between said barrier and said conical surfaces, whereby pressures within said body act against said barrier at the side thereof toward said spring seat to cause said barrier to compress said body of sealant so that sealant enters said minute openings to form a high pressure seal.

5. A choke device comprising a body having a flow path therethrough including an intermediate smooth-walled portion, an inlet through said body to said flow path, an outlet through said body from said flow path, separate access means through said body to said smooth-walled portion of said flow path between said inlet and said outlet, closure means for said access means connected to said body and having an extension loosely received through said access means, flow constricting means removably connected only to said extension and not to said smooth-walled flow path portion within which it is disposed, means for sealing between said flow constricting means and said smooth-walled flow path portion; said extension holding said flow constricting means in said smooth-walled flow path portion whereby there are no interior flow path threads susceptible of corroding and galling.

6. A choke device comprising a body having a flow path therethrough including an intermediate smooth-walled portion, an inlet through said body to said flow path, an outlet through said body from said flow path, separate access means through said body to said smooth-walled portion of said flow path between said inlet and said outlet, closure means for said access means connected to said body and having an extension loosely received through said access means, flow constricting means removably connected only to said extension and not to said smooth-walled flow path portion within which it is disposed, means surrounding said flow constricting means for sealing between said flow constricting means and said smooth-walled flow path portion, said extension holding said flow constricting means in said smooth-walled flow path portion whereby there are no interior flow path threads susceptible of corroding and galling.

References Cited in the file of this patent

UNITED STATES PATENTS

| | | |
|---|---|---|
| 1,827,063 | Carlstedt | Oct. 13, 1931 |
| 2,294,499 | Henkell et al. | Sept. 1, 1942 |
| 2,415,992 | Clair | Feb. 18, 1947 |
| 2,491,599 | Allen | Dec. 20, 1949 |
| 2,536,898 | Works | Jan. 2, 1951 |

FOREIGN PATENTS

| | | |
|---|---|---|
| 475,320 | Canada | July 17, 1951 |